Oct. 10, 1961  G. L. HELLER ET AL  3,003,855
CARBON BLACK MANUFACTURE
Filed April 27, 1959

INVENTORS
GEORGE L. HELLER
CHARLES L. DeLAND
BY
Pennie, Edmonds, Morton, Barrows & Taylor
ATTORNEYS

United States Patent Office

3,003,855
Patented Oct. 10, 1961

3,003,855
CARBON BLACK MANUFACTURE
George L. Heller, Monroe, and Charles L. De Land, West Monroe, La., assignors to Columbian Carbon Company, New York, N.Y., a corporation of Delaware
Filed Apr. 27, 1959, Ser. No. 809,261
8 Claims. (Cl. 23—209.4)

This invention relates to the manufacture of carbon black and especially to improvements in processes therefor of the type in which a hydrocarbon oil, or similar liquid carbon-containing compound, herein sometimes called hydrocarbon make, or make oil, is injected as a gas-atomized liquid spray into a body of hot gases and is decomposed by heat from the hot gases to form carbon black in gaseous suspension from which it is separated and collected.

More particularly, the invention provides a method for producing from high molecular weight, highly aromatic residues from petroleum, coal tars, or the like, a carbon black of remarkably low oil absorption characteristics.

The oil absorption characteristics of carbon blacks have been recognized to vary with the aggregate surface area of the black. As the mean particle diameter of the carbon black particles decreases, its surface area, frequently expressed as square meters per gram, generally increases with a resultant increase in oil absorption.

However, the oil absorption properties of carbon black are also known to be markedly influenced by a characteristic of the black known as "structure," which is a joining together of the carbon particles to form reticulate chains or clusters. For a carbon black of a given mean particle diameter, a high oil absorption characteristic is indicative of such structure.

High structure is a desirable property of carbon black for some purposes. For instance, blacks having a high structure improve the extruding properties of rubber compositions with which they are compounded. For other purposes, a low or moderate oil absorption or structure is more desirable. For instance, carbon blacks of low oil absorption are more advantageously used for compounding with natural rubber where low heat build-up properties are desirable. They are also used with advantage in the production of printing inks, especially newsprint inks where high carbon black loading is desirable. Frequently, a high carbon black loading is also required for paint-priming undercoats in order to harden the film for sanding and here, also, a carbon black of low oil absorption characteristics is desirable. For all of these purposes, the carbon black produced in accordance with our present invention is especially useful. It may also be used with particular advantage as a starting material for the production of a very pure form of graphite.

A known way of controlling structure, and oil absorption, within limits, independently of particle size, is by the selection of the feed stock to be decomposed for producing the carbon black. It is known that the use of paraffinic-type feed stocks normally tend to produce carbon blacks of low structure and relatively low oil absorption for a given mean particle diameter. On the other hand, the use of aromatic oils and tars generally tends to produce carbon blacks of relatively high structure and high oil absorption characteristics.

However, the oil absorption characteristic of a carbon black is normally very difficult to control independently of surface area and charging stock. Usually, in furnace operations, conditions such as air ratio and the like, are so set as to produce a carbon black of the required fineness and the oil absorption characteristics are independently controllable only within a relatively narrow range.

A disadvantage of using paraffinic oils for producing carbon blacks of low oil absorption is that the yield of carbon black per gallon of such oil is relatively low. The aromatic feed stocks, such as petroleum residues and coal tars, inherently produce higher yields of carbon black, but the carbon black produced therefrom has been characterized by high structure.

As previously noted herein, the carbon blacks produced from these highly aromatic petroleum residues, coal tars and the like, in accordance with our present invention, have surprisingly low structure and low oil absorption characteristics. However, the process has the further advantage of the high yields characteristic of this type of make.

The present process resembles, in some respects, the process for producing high structure blacks described and claimed in Patent No. 2,779,665 in accordance with which a gently flowing current of air is passed upwardly into the lower end of a vertically elongated furnace chamber and a liquid aromatic hydrocarbon, or like carbon-containing compound, of specified characteristics, is sprayed upwardly into the upwardly rising air current, whereby a portion of the carbon-containing material is burned in the lower end of the chamber by contact with the air, the proportion of oxygen thus introduced being so controlled as to maintain in the chamber above the burning zone a non-turbulent, slowly rising atmosphere of reducing gases. According to that process, a smoke blanket is maintained in the upper portion of the furnace chamber, its lower boundary being well above the spray head for the hydrocarbon make.

We have now found that a most amazing change in the characteristics of the resultant carbon black can be brought about by certain relatively simple changes in the operating conditions of processes of that general type. We have found, more particularly, that instead of producing a carbon black of high oil absorption characteristics, as would be expected, one can produce, from a highly aromatic residual oil of the type described herein, a carbon black of low oil absorption characteristics by injecting the spray of hydrocarbon make directly into the smoke blanket and preventing contact of unburned air with the oil droplets of the spray as they enter the furnace chamber, except as hereinafter described.

According to a particularly advantageous aspect of the present invention, hot furnace gases are generated by burning a multiplicity of gas flames initiated in the lower portion of the furnace chamber and uniformly spaced about the periphery of the chamber, i.e., near the vertical wall thereof, so as to avoid contact between the burning flames and a centrally positioned make oil spray injected vertically into the furnace chamber, as hereinafter described.

For producing these flames, separate burner tubes are provided, advantageously projecting upwardly into the chamber through the furnace floor. Air for supporting combustion of these peripheral gas jets is provided by passing a regulated stream of air upwardly around each burner tube. The furnace chamber is thus heated to a temperature in excess of the decomposition temperature of the hydrocarbon and, upon injection of the hydrocarbon make, a dense blanket of smoke is formed within the furnace chamber.

In accordance with our present invention, this smoke blanket is formed primarily, if not entirely, by decomposition of the hydrocarbon make by heat absorbed from the surrounding stream of hot combustion gases and from the furnace walls, which are heated to radiant temperature by the hot combustion gases, as distinguished from partial combustion of the hydrocarbon make.

The make oil spray may be injected vertically downwardly into the smoke blanket, filling the upper portion of the furnace chamber, from a point near the upper end of the chamber or may be directed vertically upwardly into the chamber. In the latter case, the spray head should be near, more advantageously, substantially flush with, the floor of the chamber and the lower boundary of the smoke blanket should be caused to move downwardly to approximately the level of the spray head so as to shroud the spray of the hydrocarbon as it enters the furnace chamber.

This lowering of the smoke blanket may be effective, for instance, by regulation of the stack-fan damper, or a damper between the furnace and the collection system, so as to exert a back pressure on the furnace chamber.

We have found that this lowering of the oil absorption characteristics of the black is generally promoted by relatively low furnace gas velocities. The pressure of the atomizing fluid and the velocity of the entering make spray do not appear to be critical. The ratio of air to fuel gas likewise does not appear to be critical. This ratio may, for instance, be as high as 16:1 or 20:1 so long as no unburned air present in the hot combustion gases is inspired into the entering oil spray.

As just noted, it is not necessary that the air-gas ratio of the peripheral flames be adjusted to produce a neutral or reducing flame. In other words, it is not necessary that all of the air introduced around the peripheral gas jets be completely consumed by the peripheral gas flames so long as air from that source is not permitted to come into contact with the entering oil spray.

The present process is primarily distinguished from that of the above-noted Patent No. 2,779,665 in the respects just described. While we cannot explain with certainty the reason for the surprising difference in oil absorption characteristics of the resultant product, we have by our present process produced, from comparable charging stock, carbon blacks having a surprisingly lower order of oil absorption characteristics, e.g., within the range of 7 to 13 gallons of oil per 100 pounds of carbon black, determined by conventional methods.

One possible explanation for these surprising results is that decomposition of the hydrocarbon make to carbon black involves polymerization and condensation reactions and that where air is inspired into the oil spray as it enters the furnace chamber, the oxygen in some way influences the molecular structure of the intermediate products of the polymerization and condensation reactions which, in turn, influence in some way the structure characteristics of the carbon black produced therefrom by further pyrolysis.

Another possible partial explanation of the surprising difference of the carbon black produced in accordance with our present invention is that the entering spray of finely-divided oil droplets is shielded by the smoke blanket from radiant heat from the surrounding peripheral flames and hot furnace floor and wall, and that, therefore, the rate of heat transfer to the oil droplets is reduced and gasification of the oil is of a much milder nature. Some moderate turbulence of this shrouding smoke blanket appears to aid in the prevention of high structure formation and the production of relatively smooth carbon particle surfaces. Though the degree of turbulence is subject to considerable variations, it is essential that any such turbulence not be of such nature as to bring the entering combustion-air oxygen into contact with the entering oil spray.

Whatever the explanation, our present invention provides means whereby carbon blacks of low structure and low oil absorption characteristics may be economically produced in high yield from the previously described high molecular weight aromatic hydrocarbons such as cracked petroleum residues and coal tars.

The invention will be further described with reference to the acompanying drawings, in which.

Figure 2:
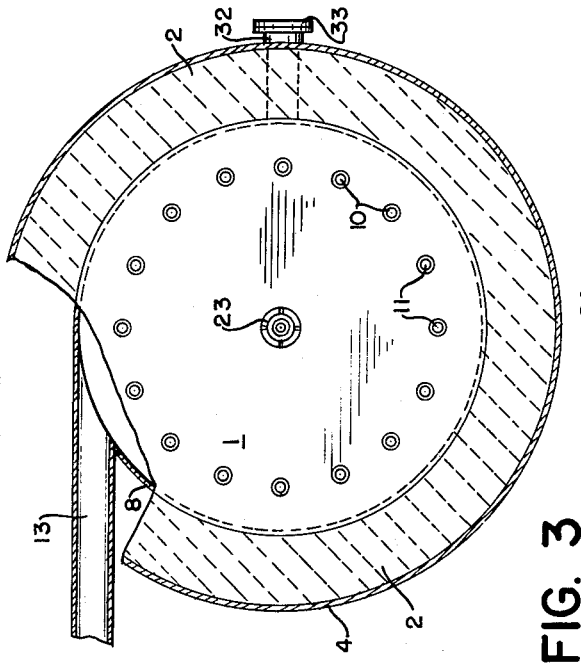
FIG. 2 is a horizontal sectional view along line 2—2 of FIG. 1.

In the apparatus respresented by the drawing, a vertically elongated furnace chamber 1 is enclosed by a vertically-extending cylindrical side wall 2 and an inwardly-tapering upper side wall 3, each constructed of furnace refractory and heat insulation material conventionally used for such purpose, and jacketed by a metal casing 4.

The upper end of the chamber is provided with an exit flue 5 for the furnace effluent leading to conventional means, not shown, for separating and collecting the carbon black from the gaseous suspension.

The lower end of the chamber is closed by a refractory floor 6 beneath which there is provided an air chamber 7 delineated by a circular side wall 8 and a floor 9.

Fuel burners 10, extending vertically through the air chamber 7 and floors 9 and 6, are symmetrically positioned in a circle adjacent the periphery of the chamber and spaced inwardly slightly from the side wall 2. Each of these burners is surrounded by a coaxially positioned annular passageway 11 leading from the air chamber 7 into the furnace chamber 1 for the introduction of air for combustion of the fuel gas supplied to the respective burners through conduits 12 which, in turn, are connected to a suitable manifold, not shown.

Air for combustion is supplied to the chamber 7 through conduit 13 which enters the chamber tangential to the chamber side wall 8 so as to give more even distribution of air to the respective burners.

In operation, fuel gas, for instance natural gas, in a regulated, uniform amount, is supplied to the respective peripheral burners and, as it passes from the upper end thereof, is admixed with air or other oxygen-containing gas passing upwardly around the gas stream from the annular openings 11. The proportion of oxygen-containing gas thus supplied may be so regulated, relative to the proportion of fuel gas, as to produce either substantially oxidizing or non-oxidizing combustion gases rising upwardly through the furnace chamber. The amount of fuel gas thus burned is so regulated and controlled that the resultant hot products of combustion pass upwardly through the chamber as a relatively quiescent stream, advantageously at a velocity within the range of 1 foot to 6 feet per second, though somewhat higher velocities may be used.

The hydrocarbon make is injected vertically as a gas-atomized spray into the highly heated furnace chamber from a position substantially coaxial with the furnace chamber, thus forming within the furnace chamber the previously described heavy smoke blanket. Advantageously, the hydrocarbon make may be injected downwardly into the rising smoke blanket from a position adjacent the upper end of the chamber. For this purpose, we have shown a spray assembly 14 equipped with a cluster of three vertically positioned spray nozzles 15. It will be understood, however, that the invention is not restricted to any particular number of spray nozzles used.

Steam or other atomizing gas is charged through conduit 16, and the hydrocarbon make, advantageously preheated, is charged through conduit 17, into a mixing chamber indicated at 18 and from thence passes through conduit 19 to the spray nozzles 15. That portion of the assembly which extends through the furnace wall and into the furnace chamber is with advantage protected from overheating by a cooling jacket 20 through which a coolant is circulated. For instance, water or other cooling fluid is supplied through conduit 21 to the inner end of the assembly and is discharged through conduit 22. Spray assemblies of this type are known to the art and are readily available and need not here be further described.

Figure 3:
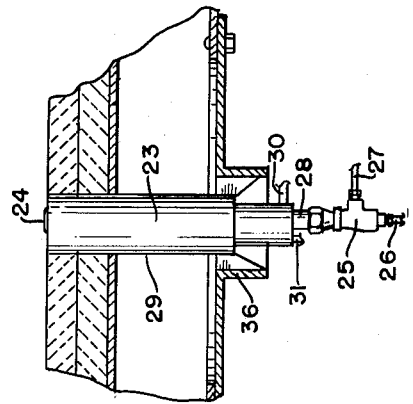
FIG. 3 is a somewhat enlarged fragmentary elevational view showing a two-fluid atomizer for spraying the hydrocarbon make upwardly into the furnace chamber.
Figure 1:
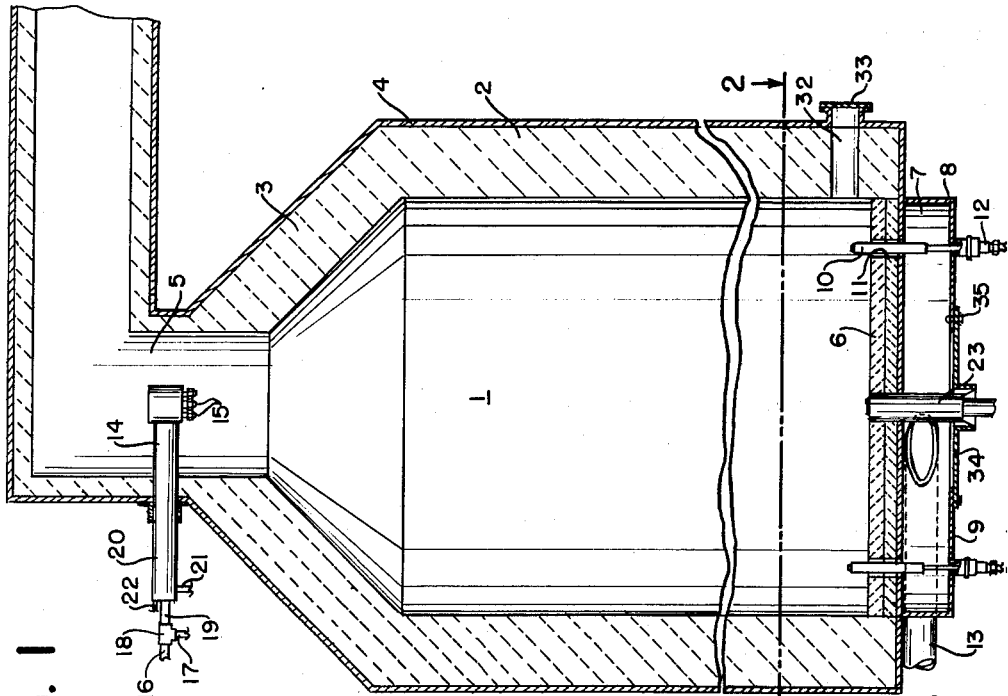
FIG. 1 is a vertical sectional view of a furnace especially adapted to the carrying out of our process.

As an alternative, the hydrocarbon make may be sprayed upwardly into the furnace chamber by means of a spray assembly 23, more clearly represented in FIG. 3 of the drawings. With this arrangement, the spray nozzle should be approximately flush with the upper surface of the furnace floor 6.

The spray assembly shown in FIG. 3 comprises a single spray nozzle 24. The atomizing gas and the hydrocarbon make are charged to mixing chamber 25 through conduits 26 and 27, respectively, and passed to the spray nozzle through conduit 28. This assembly is likewise, with advantage, thermally shielded by a water jacket indicated at 29 to which water or other cooling fluid is supplied through conduit 30 and passes therefrom through conduit 31.

In the foregoing description, we have illustrated spray assemblies of the type in which the hydrocarbon make and atomizing gas are mixed before passing through the furnace wall. However, one may use, with advantage, spray assemblies of the equally well-known type in which the oil and atomizing gas are mixed just ahead of the nozzles.

Whichever type of spray assembly is used at the lower end of the furnace chamber, it should be so sealed into the furnace floor as to prevent the passing of air from the air chamber 7 into the furnace chamber 1 in the vicinity of the oil spray, the only air permitted to enter the furnace chamber being that for combustion of the fuel gas introduced as previously described, with the possible exception of air used as the atomizing gas.

There is provided in the lower end of the furnace wall a peephole 32 which, in operation, is closed by the cap 33. Also, for convenience in removing the lower spray assembly, we have provided a removable plate 34 attached to the floor 9 of the air chamber by bolts 35, the assembly being sealed in plate 34 by means of a packing gland indicated at 36.

When the hydrocarbon make is injected downwardly from the upper end of the chamber, the initial jet velocity of the spray should be so correlated with the velocity of the upwardly-rising smoke blanket that the entering hydrocarbon spray will pass counter to the upwardly-rising gases a sufficient distance to provide adequate contact time to complete the decomposition of the hydrocarbons to carbon black. The required initial velocity will, of course, vary with the velocity of the upwardly-rising gas and the desired characteristics of the carbon black product, especially with respect to the proportion of extractable material remaining therein. It is impractical to assign numerical values to these initial jet velocities because it is extremely difficult, if not impossible, accurately to measure such velocities. However, optimum initial velocities for a given set of operating conditions are readily determined by simple tests. For instance, in a furnace of the type shown measuring 6½ feet in diameter and approximately 8½ feet from the floor of the furnace to the upper end of the cylindrical portion of the furnace and approximately 12 feet from the floor of the furnace to the upper spray nozzle, particularly advantageous results have been obtained where the initial velocity of the downwardly directed spray has been such as to carry the hydrocarbon make downwardly against the upwardly rising gases a distance approximating two-thirds the height of the furnace chamber but not beyond the lower boundary of the smoke blanket. Substantially identical results have been obtained where the hydrocarbon make has been injected upwardly at a similar initial velocity from the lower end of the furnace chamber. Accordingly, the initial velocity of the entering make spray does not appear to be particularly critical so long as the contact time is sufficient to effect the desired decomposition of the particular make used.

However, where the oil spray is injected upwardly, as just described, the smoke blanket within the furnace chamber must extend downwardly to the level of the spray nozzle exit or at least to within two or three inches thereof so that the oil spray is shrouded by the smoke blanket at approximately the instant it enters the furnace chamber.

As previously indicated, it is usually advantageous to preheat the hydrocarbon make before passing it to the operation so as to increase its fluidity and make it more amenable to atomization. Preheat temperatures within the range of 100° to 400° F. may be used with advantage, or even as high as 1000° F., depending upon the characteristics of the particular hydrocarbon make being used, care being taken to avoid coking of the oil lines and spray nozzle.

We have, with particular advantage, used steam as the atomizing gas under a gauge pressure ranging from 25 to 100 pounds per square inch. We have also used, with advantage, a mixture of steam and air at a gauge pressure of 25 pounds per square inch. Quite surprisingly, where air is used in this way as the atomizing gas, it does not adversely affect the oil absorption characteristics of the carbon black. This is probably due to the rapid consumption of the oxygen by the hydrocarbon with which it is intimately dispersed before the free oxygen of the atomizing air mixture can influence the oxypolymerization of vaporized hydrocarbons.

The invention will be further illustrated by the following specific examples of operations carried out in accordance with our present invention in apparatus substantially as shown in the drawings. In these operations, the dimensions of the furnace chamber were as previously described. The fuel gas was burned from 16 burners spaced apart an equal distance over a circle approximately 2 feet in diameter, said burners extending approximately 3 inches above the furnace floor. The upper ends of these burners were "Carbofrax" tubes ½ inch i.d. and 1¼ inch o.d. centered in openings in the furnace floor 2½ inches in diameter.

In each of these operations, the hydrocarbon make was a highly aromatic petroleum residue known to the industry as "pressure tar" and resulting from the thermal cracking of the recycled stock from the catalytic cracking of petroleum for the production of motor fuel and having the following approximate analysis:

| | |
|---|---|
| Viscosity, SSU at 210° F | 47 |
| A.P.I. gravity | 1.8 |
| Average molecular weight | 264 |
| Percent aromaticity | 85 |

The charging rates of air, fuel gas and oil, and other operating conditions and the yields and characteristics of the resultant carbon black are set forth in the following tabulation:

*Table 1*

| Example | 1 | 2 | 3 | 4 | 5 | 6 | 7 |
|---|---|---|---|---|---|---|---|
| Air, M c.f.h. | 30 | 50 | 50 | 50 | 50 | 50 | 45. |
| Air-Fuel Gas Ratio | 16.35/1 | 16/1 | 12/1 | 10/1 | 10/1 | 10/1 | 10/1. |
| Oil-Charge Rate, g.p.h. | 24 | 30 | 30 | 30 | 24 | 24 | 27. |
| Atomizing Fluid | Steam | Steam | Steam | Steam | Steam | Steam | Air and Steam. |
| Atomizing Fluid Press., p.s.i.g. | 30 | 30 | 50 | 50 | 50 | 100 | 25—25. |
| Spray Position | Top | Top | Top | Top | Top | Top | Flush with furnace floor. |
| Oil Preheat, °F | 230 | 400 | 260 | 260 | 260 | 260 | 240. |
| Yield of carbon black, #/gel. of oil | 3.63 | 2.66 | 3.79 | 4.04 | 2.44 | 3.09 | 2.47. |
| Color, ABC | 75 | 82 | 85 | 85 | 60 | 74 | 54. |
| Tinting Strength, Percent Standard. | 51 | 56 | 72 | 69 | 39 | 52 | 37. |
| Oil Absorption, Gals/100 lbs. | 11.4 | 12.8 | 12.7 | 12.6 | 8.8 | 9.0 | 7.27. |

In runs 1 to 5, inclusive, in which the make spray was injected downwardly into the furnace chamber, the lower boundary of the smoke blanket was maintained at approximately one-third the height of the furnace chamber. In runs 6 and 7, the lower boundary of the smoke blanket was maintained at approximately the level of the furnace floor.

In Examples 1, 3 and 4, the downwardly directed oil spray was produced by a National Aeroil SA No. 2 mixer equipped with a fog jet spray tip. In Examples 2 and 5, a No. 6 BM spray nozzle was used and in Examples 6 and 7, there was used a cluster of three No. 4 BM spray nozzles.

It will be understood that the invention is not restricted to the particular hydrocarbon residue used in the foregoing specific examples but is applicable to various residues of petroleum and coal tars having an average molecular weight in excess of 100 and an aromaticity of at least 50%. Maximum benefits are derived, however, in conjunction with the use of a hydrocarbon make of average molecular weight ranging from about 200 to about 350 and an aromaticity ranging from about 70% to about 95%.

The average molecular weights referred to above are determined by the freezing-point depression method as described, for instance, in Encyclopedia of Chemical Technology, Kirk-Othmer, vol. 8, page 851, and the proportion of aromaticity is determined by the silica gel adsorption method of Mair as described, for instance, in vol. 12 of the same publication, on page 355, using petroleum ether as the solvent.

The invention is, likewise, not restricted to the use of a gaseous fuel for the peripheral flames, but also contemplates the use of other fluid fuels, e.g., light fuel oils or the like. Further, instead of generating the hot furnace gases by means of peripheral flames within the chamber, the hot gases may be generated outside of the chamber by burning a gaseous, liquid or solid fuel and the resultant hot products of combustion passed upwardly into the furnace chamber as an annular stream adjacent the periphery of the chamber. It is, of course, essential that the gases thus introduced into the chamber be of a temperature adequate to heat the chamber to a temperature in excess of the decomposition temperature of the hydrocarbon make and, particularly if they contain free oxygen, that they be so introduced as not to result in the inspiration of unburned oxygen into the liquid spray stream. It is also desirable that they be as free as possible from ash or other solids undesirable in the finished product.

It is also entirely satisfactory to use, as the atomizing gas, a portion of the effluent gases from the operation from which the carbon black and excess moisture have been removed.

We claim:
1. Process for producing low structure carbon blacks from normally liquid hydrocarbons comprising injecting a gas-atomized liquid spray of the hydrocarbon substantially vertically and coaxially into a vertically elongated, heat-insulated furnace chamber heated to a temperature in excess of the decomposition temperature of the hydrocarbon by passing hot gaseous products of combustion upwardly through the chamber adjacent the periphery thereof and so removed from the spray stream as to avoid inspiration into the liquid spray of any unburned oxygen present therein, and thereby producing within the furnace chamber a dense blanket of smoke, and shrouding the liquid spray with said blanket of smoke substantially immediately upon the entrance of the spray into the chamber, thereby decomposing the hydrocarbon into carbon black in gaseous suspension by heat absorbed from the hot smoke blanket while shielding the spray by said smoke blanket from contact with any unburned oxygen present in the furnace gases and thereby preventing combustion of the hydrocarbons in the zone of carbon black formation, passing the suspension from the upper end of the furnace chamber and separating the carbon black therefrom.

2. Process for producing, from aromatic hydrocarbon residues and tars, carbon blacks of low structure characteristics comprising burning a combustible mixture of a fluid fuel and a free oxygen-containing gas as a multiplicity of flames symmetrically positioned at the lower end of, and adjacent the periphery of, a vertically elongated, heat-insulated furnace chamber and thereby generating a non-turbulent body of combustion gases passing upwardly through said chamber at a temperature above that at which the hydrocarbon is decomposed to carbon black, injecting a gas-atomized liquid spray of the hydrocarbon to be decomposed substantially vertically and coaxially into the furnace chamber, out of contact with said peripheral flames and avoiding inspiration into the spray stream of any unburned oxygen of the combustible mixture, and thereby producing a dense blanket of smoke within the furnace chamber, so adjusting the boundaries of this smoke blanket that the spray on entering the furnace chamber immediately enters said smoke blanket and thereby decomposing the hydrocarbon to carbon black in gaseous suspension by heat absorbed from the hot smoke blanket while shielding the spray by said smoke blanket from contact with any unburned oxygen present in the furnace gases and thereby preventing combustion of the hydrocarbons in the zone of carbon black formation, passing the suspension from the upper end of the furnace chamber and separating the carbon black therefrom.

3. The process of claim 2 in which the hot gases pass upwardly through the furnace chamber at a velocity within the range of 1 foot to 6 feet per second.

4. The process of claim 2 in which the gas-atomized spray of the hydrocarbon is directed downwardly from the upper end of the furnace chamber into the upwardly rising smoke blanket at a velocity substantially in excess of the upward velocity of the hot gases of the smoke blanket.

5. The process of claim 2 in which the atomized spray of hydrocarbon is directed upwardly into the smoke blanket from a point substantially flush with the floor of the chamber.

6. The process of claim 2 in which the hydrocarbon to be decomposed is one having a molecular weight in excess of 100 and an aromaticity of at least 50%.

7. The process of claim 6 in which the hydrocarbon to be decomposed is one having an average molecular weight ranging from about 200 to about 350 and an aromaticity ranging from about 70% to about 95%.

8. Process for producing, from aromatic hydrocarbon residues and tars, carbon black of low structure characteristics comprising injecting upwardly into a vertically elongated, heat-insulated furnace chamber a multiplicity of jets of fuel gas symmetrically positioned at the lower end of, and adjacent the periphery of, said chamber, passing upwardly into the furnace chamber a current of air surrounding each of the fuel gas jets, separately burning the jets of fuel gas and air and thereby generating a non-turbulent body of combustion gases passing upwardly through said chamber at a temperature above that at which the hydrocarbons are decomposed to carbon black, injecting a gas-atomized liquid spray of the hydrocarbons to be decomposed substantially vertically and coaxially into the furnace chamber out of contact with the peripheral flames and avoiding inspiration into the spray stream of any unburned oxygen of the combustible mixture, and thereby producing a dense blanket of smoke within the furnace chamber, so adjusting the boundaries of this smoke blanket that the spray on entering the furnace chamber immediately enters said smoke blanket, thereby decomposing the hydrocarbon to carbon black in gaseous suspension by heat absorbed from the hot smoke blanket while shielding the spray by said smoke blanket from contact with any unburned oxygen present in the furnace gases and thereby preventing combustion of the hydrocarbons in the zone of carbon black formation, and excluding other free oxygen-containing gases from the chamber, passing the suspension from the upper end of the furnace chamber and separating the carbon black therefrom.

References Cited in the file of this patent

UNITED STATES PATENTS

| | | |
|---|---|---|
| 2,779,665 | Heller | Jan. 29, 1957 |
| 2,813,009 | Ekholm et al. | Nov. 12, 1957 |